(No Model.) 2 Sheets—Sheet 1.
H. C. GOODRICH.
VELOCIPEDE.
No. 455,395. Patented July 7, 1891.
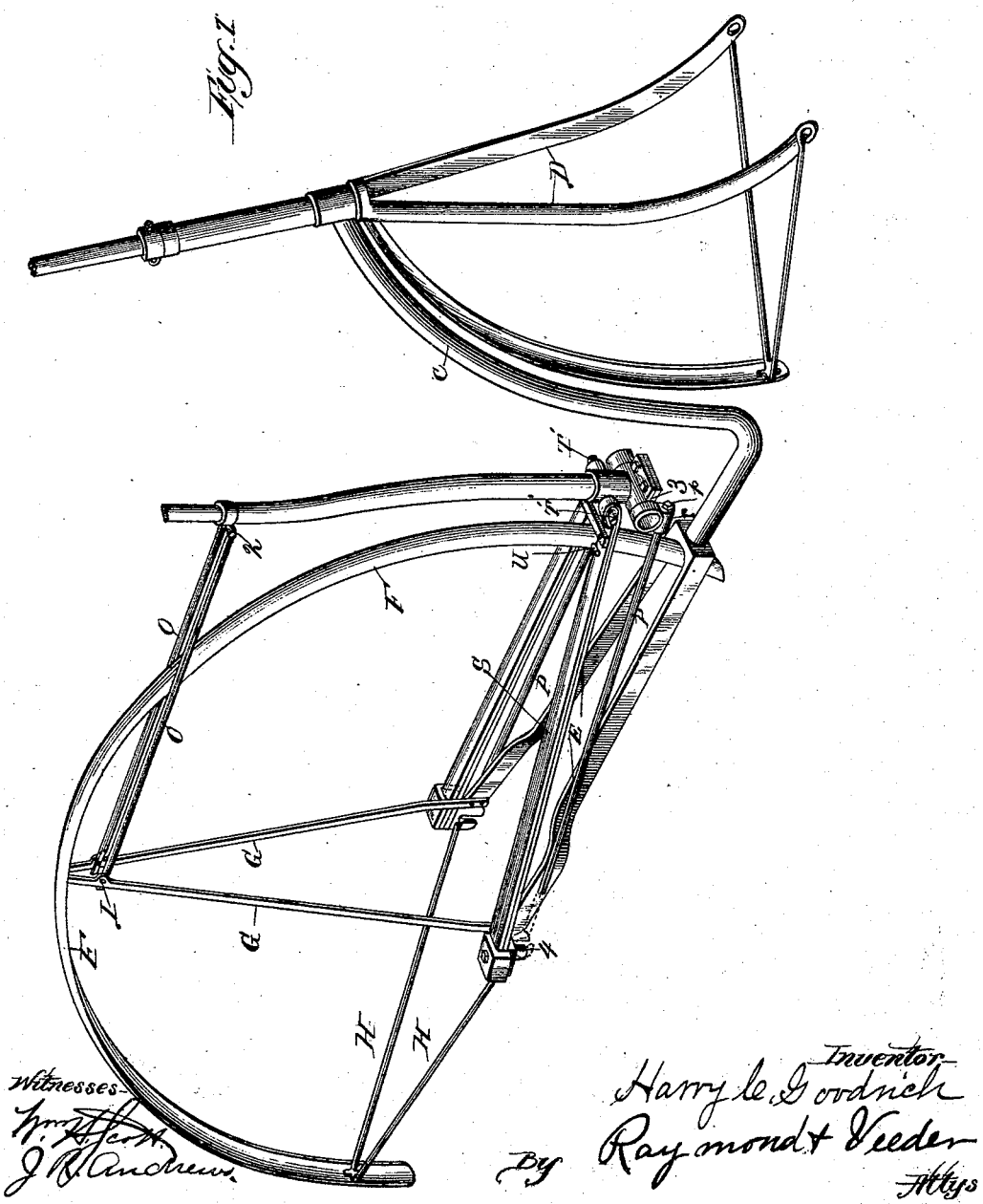

(No Model.)  2 Sheets—Sheet 2.
H. C. GOODRICH.
VELOCIPEDE.
No. 455,395. Patented July 7, 1891.
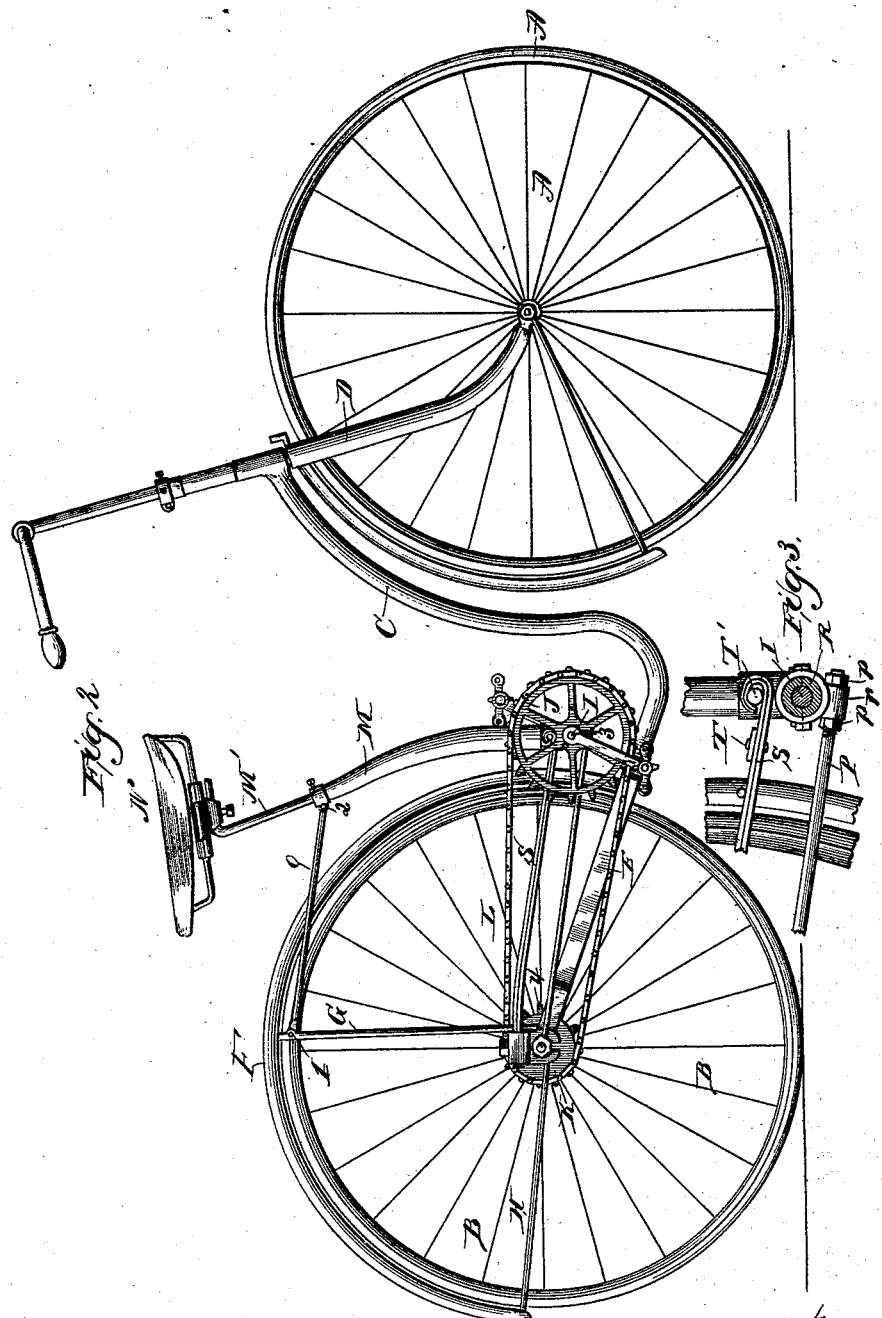

UNITED STATES PATENT OFFICE.

HARRY C. GOODRICH, OF CHICAGO, ILLINOIS, ASSIGNOR, BY MESNE ASSIGNMENTS, TO THE VELOCITY MANUFACTURING COMPANY, OF ILLINOIS.

VELOCIPEDE.

SPECIFICATION forming part of Letters Patent No. 455,395, dated July 7, 1891.

Application filed November 27, 1889. Serial No. 331,798. (No model.)

*To all whom it may concern:*

Be it known that I, HARRY C. GOODRICH, of Chicago, in the county of Cook and State of Illinois, have invented certain new and useful Improvements in Velocipedes, of which the following is a specification.

My invention relates to vehicles propelled wholly or partially by the feet of the rider, its purpose being to lessen the transmission of jar and vibration to the rider while passing over rough roads.

An object had in view in the carrying out of the primary purpose is to so construct and connect the parts that however great the jar communicated to the vehicle the rider will retain a firm and easy hold on the pedals and can at all times exert his full power without risking a fall or other accident by losing his footing.

My invention is adaptable to a tricycle or any velocipede having two or more wheels; but in the accompanying drawings, it is shown applied to a bicycle of the Safety pattern.

In the accompanying drawings, Figure 1 is a perspective view of a bicycle-frame embodying my invention. Fig. 2 is a side elevation of the bicycle complete. Fig. 3 shows a detail of the construction.

In the accompanying drawings, A and B are the leading and trailing wheels, respectively, of a bicycle of the Safety type.

C is the backbone, D the front fork, and E the rear fork.

Around the rear wheel a guard F extends, being secured to struts G G H H and to the backbone or fork, the parts named from C to H constituting the frame-work of the vehicle. The front wheel A is the steering and the rear B is the driving wheel, the latter being connected to the pedal-shaft I by sprocket-wheels J K and chain L or in any equivalent manner. The pedal-shaft I is journaled at the lower end of a bar M, the upper end of which supports the rider's seat N through the intermediary-seat rod M', which affords an adjustment by which the height of the seat may be changed as desired in the ordinary way, the connection between the pedal-shaft and the seat being, while the vehicle is in use, rigid and unchanging. The bar M is connected to the frame by links O O P P, connected, respectively, to the upper and lower ends of the bar M and to the frame of the bicycle. The points of connection 1 2 3 4 of the said links should form a parallelogram as nearly as may be practicable, and the links should, in their middle position, be horizontal, as thereby a parallel vertical motion only will be permitted in the bar M; but a slight departure from strict accuracy in these regards is not material.

The connection of the lower links P P is shown in detail in Figs. 2 and 3. A sleeve R is fitted in the lower end of the bar M, so as to be capable of partial rotation therein. An ear $r$ is provided on the sleeve R for each link P, the end of the link being threaded and provided with nuts $p$ $p$, which may be screwed against the ears $r$. The sleeve R contains the pedal-shaft I, suitable ball or other bearings being provided, but not shown herein, as the present invention is not concerned therewith. The pivotal center of the links P P at their point of attachment to the bar M is thus coincident with the axis of the pedal-shaft. As shown, the other ends of links P P are pivoted to the axle of the drive-wheel B. By adjusting the nuts $p$ $p$ the tension of the drive-chain may be regulated, and the relative motion of the frame and the bar M and its attached pedal-shaft will not alter the said tension; but here again absolute accuracy is not essential, for the arc of movement of the bar M and the pedal-shaft I is so small compared with the length of the links P P that it will suffice if the pivot-points of the links P P are in the line drawn from the axis of the drive-wheel to the axis of the pedal-shaft when the latter is at or near the middle of the arc described by it. The support for the bar M, which forms the connection for transferring the weight of the rider from the bar M to the frame of the vehicle, is a spring S, supported by said frame and extending to said bar M. The preferred form of said spring is best shown in Fig. 1, and consists of two or more leaves on each side of the wheel rigidly secured at one end to the frame above the axle of the rear wheel and extending about parallel to the links P P, the opposite ends being looped round a cross-piece through the bar M. A tie-piece T is used to keep the ends of the springs in place, and a pin U, secured to the guard F, prevents the spring from rising too high.

It is obvious that the spring S, in addition to its own function, may also perform the function of the upper or lower links O P if it be located in the position of one or the other, and hence where I use the term "link" I wish to be understood as including the spring thereunder when it fulfills the purpose of the link.

In the construction described the pedals and the seat always maintain the same relations whatever the jar and vibration of the wheels.

I am aware that it is not new to connect the seat and pedal-shaft to each other independently of the velocipede-frame and to connect them to the frame by links and springs, and therefore do not claim such devices, broadly; but by my construction the horizontal movement imparted to the seat and pedals by the passage of the wheels over rough ground is minimized, the motion permitted by the links being almost exactly vertical, by reason of the fact that the links are both of substantially the same length and both extend rearwardly from the connection between the seat and pedals, and are therefore very nearly parallel in all positions. Furthermore, by my construction the space between the seat and the front wheel is left unobstructed, rendering the velocipede available for ladies' use.

What I claim, and desire to secure by Letters Patent, is—

1. The combination, in a velocipede, of a seat, a pedal-shaft, a rigid connection between them, parallel links substantially equal in length attached to the frame and to said connection, one of said links extending between the driving-wheel axle and the pedal-shaft and the other extending rearwardly from the upper part of said rigid connection to the upper part of the frame, the four points of connection of said links forming approximately a parallelogram, whereby a vertical parallel motion is permitted to said seat and pedal-shaft, the links being parallel in all positions, and a spring supported by the frame and supporting the seat and pedal-shaft, substantially as described.

2. The combination, in a velocipede, of a seat, a pedal-shaft, a rigid connection between them, parallel links substantially equal in length attached to the frame and to said connection, one of said links extending between the driving-wheel axle and the pedal-shaft and the other extending rearwardly from the upper part of said rigid connection to the upper part of the frame, the four points of connection of said links forming approximately a parallelogram, whereby a vertical parallel motion is permitted to said seat and pedal-shaft, the links being parallel in all positions, and a leaf-spring secured at one end to the frame near the rear-wheel hub, extending parallel to said links, and secured at the other end to the connection between the seat and the pedal-shaft, substantially as described.

3. The combination, in a velocipede, of a seat, a pedal-shaft, a rigid connection between them, parallel links substantially equal in length attached to the frame and to said connection, one of said links extending between the driving-wheel axle and the pedal-shaft and the other extending rearwardly from the upper part of said rigid connection to the upper part of the frame, the four points of connection of said links forming approximately a parallelogram, whereby a vertical parallel motion is permitted to said seat and pedal-shaft, the links being parallel in all positions, a leaf-spring secured at one end to the frame near the rear-wheel hub, extending parallel to said links, and secured at the other end to the connection between the seat and the pedal-shaft, and a stop, as U, upon the frame limiting the upward movement of the spring, substantially as described.

4. The combination, in a bicycle, of a flat leaf-spring attached at its rear end to the frame, and a seat-standard having a loose connection with and carried by the spring, substantially as and for the purpose specified.

5. The combination, in a bicycle, of a flat leaf-spring attached at its rear end to the frame, a seat-standard connected with and carried by the spring, and links jointed to the lower end of the seat-standard and to the frame, substantially as and for the purpose specified.

6. The combination, in a bicycle, of a flat leaf-spring attached at its rear end to the frame, a seat-standard connected with and carried by the spring, lower links jointed to the lower end of the seat-standard and to the frame, and upper links parallel with the yoke and pivoted to the seat-standard and to the frame, substantially as and for the purpose specified.

HARRY C. GOODRICH.

Witnesses:
IRWIN VEEDER,
P. H. T. MASON.